(12) United States Patent
Fujii et al.

(10) Patent No.: US 7,153,198 B2
(45) Date of Patent: Dec. 26, 2006

(54) FIXTURE FOR SLIDER LAPPING, LAPPING DEVICE AND LAPPING METHOD

(75) Inventors: Ryuji Fujii, HongKong (HK); Koji Hosaka, HongKong (HK); GuoWei Li, Dongguan (CN); XiaoMing Hong, Dongguan (CN); XiangBin Xiao, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 11/252,210

(22) Filed: Oct. 18, 2005

(65) Prior Publication Data

US 2006/0160473 A1 Jul. 20, 2006

(30) Foreign Application Priority Data

Oct. 18, 2004 (CN) .................... 2004 1 0085493

(51) Int. Cl.
 *B24B 49/00* (2006.01)
(52) U.S. Cl. ................ 451/41; 451/5; 451/364; 451/366; 451/403; 451/405
(58) Field of Classification Search ............ 451/5, 451/41, 364, 366, 392, 403, 405, 441
See application file for complete search history.

(56) References Cited

U.S. PATENT DOCUMENTS 5,607,340 A * 3/1997 Lackey et al. ............. 451/5
5,620,356 A 4/1997 Lackey et al.
6,050,878 A * 4/2000 Kanzo et al. ............. 451/5
6,095,895 A * 8/2000 Fujita et al. .............. 451/5
6,315,636 B1 * 11/2001 Yanagida et al. .......... 451/11
6,325,699 B1 * 12/2001 Sudo et al. ............... 451/8
6,679,243 B1 * 1/2004 Sung ....................... 125/12
6,758,721 B1 * 7/2004 Shindo et al. ............. 451/5

FOREIGN PATENT DOCUMENTS

JP    2000-11315    1/2000
JP    3537726       3/2004

* cited by examiner

*Primary Examiner*—Lee D. Wilson
*Assistant Examiner*—Anthony Ojini
(74) *Attorney, Agent, or Firm*—Nixon & Vanderhye P.C.

(57) ABSTRACT

A fixture for slider lapping includes a holding portion for holding the object with its surface to be lapped toward the lapping surface of the lapping device; a main body for mounting the lapping fixture to the lapping device; a plurality of load-applied portions which are arranged along said longitudinal direction and independent from said main body, said load-applied portions receiving a load which presses the surface to be lapped to the lapping surface tightly from at least the lapping device; a plurality of connection members connecting said holding portion and said main body along said longitudinal direction at intervals; and a plurality of wrist portions connecting said connection members and said holding portion; wherein at least one wrist portion is disposed between said adjacent connection members; at least one wrist portion is disposed at each outer side of the connection members which are located at both ends of the longitudinal direction. Also disclosed is a lapping device and method using the fixture.

9 Claims, 9 Drawing Sheets

Fig. 6A
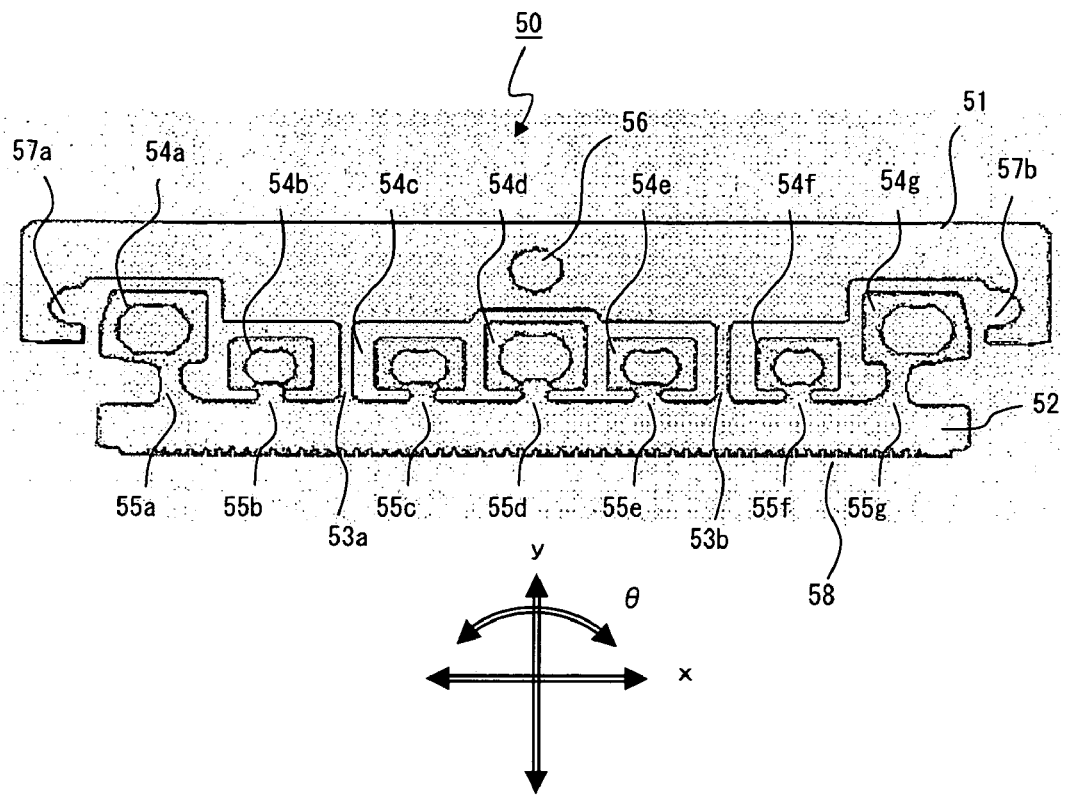
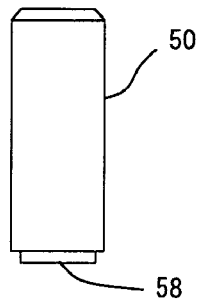
Fig. 6B
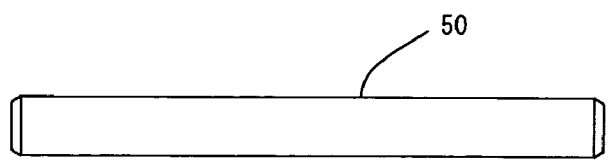
Fig. 6C
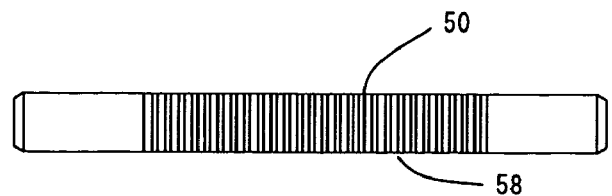
Fig. 6D

FIXTURE FOR SLIDER LAPPING, LAPPING DEVICE AND LAPPING METHOD

FIELD OF THE INVENTION

The present invention relates to a method for manufacturing sliders incorporating thin film magnetic heads, and more particularly to a slider lapping fixture, lapping device and lapping method for improving the flatness in longitudinal direction of a row bar which is constructed by an array of sliders.

BACKGROUND OF THE INVENTION

As a recording media with high-speed, sufficient capacity, strong reliability and low cost, disk drives are widely used for digital information recording. After the technology development for many years, the recording density of a disk drive has been developed to exceed 100 GB per square inch. The disk drive includes a slider incorporating a thin film head for recording and reproducing data information stored in a recording media. The slider has a surface facing to the recording media which is referred as air bearing surface (ABS).

For an MR element (magneto-resistive element, MR element) which reads information from the recording media, it is important to maintain height of the MR element (the height measured vertically from the ABS to the MR element) to its design value for ensuring reading performance of the MR element.

Because the height of MR element is obtained by lapping the ABS firstly, then removing the rest of the MR element, in process of depositing an MR element which has an original height larger than it's design value on a wafer, it is important to maintain the precision of lapping clearance of the ABS and thus maintaining the precision of the MR element height.

Further, it is important for an inductive magnetic element which writes information to the recording medium to make the throat height (the height of two opposing poles used for writing operation measured vertically from the ABS) as its design value. It is also important to maintain the precision of lapping clearance of the ABS, since the throat height is also attained by lapping the ABS.

However, because the lapping surface is disposed in a vertical direction with respect to a wafer surface which is formed two-dimensionally by pluralities of sliders, the wafer need to be sliced in advance in lapping processing so as to expose the lapping surface. Therefore, it is necessary to cut the wafer along a direction at which the lapping surface is disposed into a plurality of row bars formed by an array of sliders, and the lapping surface is lapped together with the row bar (further dicing the row bar into individual sliders and lapping in slider level is low efficient and therefore is unpractical). The row bar is supported by a predetermined fixture, then pressed onto a revolving lapping table and lapped, as disclosed in U.S. Pat. No. 5,607,340 and U.S. Pat. No. 5,620,356.

In lapping process of the row bar, it is very important to maintain not only the clearance precision of each part which form an entire slider, but also that of the whole row bar, i.e., it is critical to grind evenly the whole row bar for ensuring it's flatness.

However, in row bar lapping process using conventional technology, as the press force applied to the row bar is distributed unevenly along the longitudinal direction of the row bar, thus lapping clearance deviation is produced along longitudinal direction. Accordingly, problems arise, such as MR element height or throat height of a slider thus formed can not get its designed value and product yield of non-defective sliders decreases. One reason lies in: in fact the contour of the lapping surface of row bar should be approximately a curve of at least sixth order with respect to longitudinal direction of the row bar, while conventional row bar supporting method can simulate only curve of fourth order at most, and thus will result in low product yield, as disclosed in JP patent publication NO. 2000-11315. Therefore, a method for improving contour control freedom of the lapping surface is disclosed as follow: deforming freedom exists on a load applying member used for applying load to a row bar not only at direction toward which the row bar is pressed, but also along longitudinal direction and rotation direction of the row bar for improving control freedom, as disclosed in JP patent application NO. 3,537,726.

FIG. 8 shows a side view of a conventional fixture used in a lapping process. The lapping fixture 150 comprises a main body 151, a holding body 152 used for retaining the row bar (not shown), and a plurality of connection members 153a–153d (four connection members are shown in the figure) which connect the main body 151 and holding body 152. The row bar is secured to a row bar securing portion 158 formed at the front end of the holding body 152. In addition, the lapping fixture 150 further comprises a plurality of load-applied members 154a–154g for pressing the holding body to a revolving lapping table (not shown). The load-applied members 154a–154g are kept tight contact with the revolving lapping table by a plurality of load applying components which are inserted through holes of the load-applied members 154a–154g respectively, and then the row bar mounted on the row bar securing portion 158 is lapped. The lapping fixture 150 further comprises attaching holes 156, and matching portions 157a and 157b used for supporting the lapping fixture 150. A fixing pin (not shown) is inserted through the hole 156 and the lapping fixture 150 is mounted to a lapping device. Each of the matching portions 157a and 157b has a guide pin (not shown) inserted therethrough and the excessive displacement of the main body 151 is prevented from happening by mutual engagement formed between the matching portions 157a, 157b and guide pins.

SUMMARY OF THE INVENTION

To overcome the above shortcomings of the prior art, the present invention provides a lapping fixture which is mounted to a lapping device so as to lap an object which is to be lapped and which has a longitudinal direction, and the lapping fixture of the invention is used for retaining the object to be lapped.

The lapping fixture of the invention comprises a holding portion for holding the object with its surface to be lapped toward the lapping surface of the lapping device; a main body for mounting the lapping fixture to the lapping device; a plurality of load-applied portions which are arranged along said longitudinal direction and independent from said main body, said load-applied portions receiving a load which presses the surface to be lapped to the lapping surface tightly from at least the lapping device; a plurality of connection members connecting said holding portion and said main body along said longitudinal direction at intervals; a plurality of wrist portions connecting said connection members to said holding portion. At least one wrist portion is disposed between said adjacent connection members, and at least one wrist portion is disposed at each outer side of the connection members which are located at both ends of the longitudinal direction.

For the lapping fixture thus constructed, the load coming from the load-applied portions is transferred to the regions between connection members and regions beyond the outer sides of the connection members which are disposed at both ends. Therefore, enough pressing load can be applied to regions which are beyond the outer sides of the end connection members and where pressing load is insufficient, i.e., the pressing load can be transferred to regions adjacent the both end sides of the row bar. In addition, pressing load may be applied to at least one portion in regions between the connection members, thus, phenomena of rolling up of other region due to pressing load applied to other region can be prevented from happening.

Preferably, said two wrist portions disposed at both outmost ends of said longitudinal direction are adjacent two end portions of the longitudinal direction, said object to be lapped being attached along the longitudinal direction. Additionally, the load-applied portions receive at least load for sliding said surface to be lapped on the lapping surface along said longitudinal direction, or load for rotating said surface to be lapped around an axis which is perpendicular to both said pressing direction and longitudinal direction. Furthermore, two said connection members are disposed symmetrically along the longitudinal direction, and the main body is made of a kind of material containing SiC.

Moreover, the lapping device of the invention comprises a lapping fixture as described above, a load-applied mechanism to transfer load in pressing direction to said load-applied portions, and a lapping surface.

The lapping method of the invention is used for lapping an object to be lapped having a longitudinal direction. The lapping method comprises the steps of: pressing the holding portion, by which the object to be lapped with a longitudinal direction is held, toward the lapping surface at first positions separated at intervals along the longitudinal direction of the holding portion, and making the surface to be lapped of the object contact with the lapping surface; moving said surface to be lapped relative to the lapping surface; and providing the holding portion with a load in second regions which comprise regions between said adjacent first positions and regions beyond said first positions, and lapping said surface to be lapped of said object, said load being perpendicular to the lapping surface and pressing the surface to be lapped toward the lapping surface. Preferably, said two second positions disposed at outmost sides of the length are located adjacent both end portions of said object to be lapped.

In addition, the lapping method may also includes a step of: providing the holding portion at said second positions with load for sliding said surface to be lapped on the lapping surface along said longitudinal direction, or load for rotating said surface to be lapped around an axis which is perpendicular to both said pressing direction and longitudinal direction.

As illustrated above, the pressing load may be applied suitably to all regions of the row bar by the lapping fixture, the lapping device and lapping method of the invention. As a result, the row bar constructed with a plurality of sliders may be lapped evenly along its longitudinal direction without decreasing production efficiency or complicating the whole device.

BRIEF DESCRIPTION OF THE DRAWINGS

The accompanying drawings facilitate understanding of the various embodiments of this invention. In such drawings:

FIG. 6A is a top plan view of the lapping fixture of the invention;

FIG. 6B is a side view of the lapping fixture of the invention;

FIG. 6C is a side view of the lapping fixture of the invention;

FIG. 6D is a bottom plan view of the lapping fixture of the invention;

DETAILED DESCRIPTION OF ILLUSTRATED EMBODIMENTS

Figure 1:
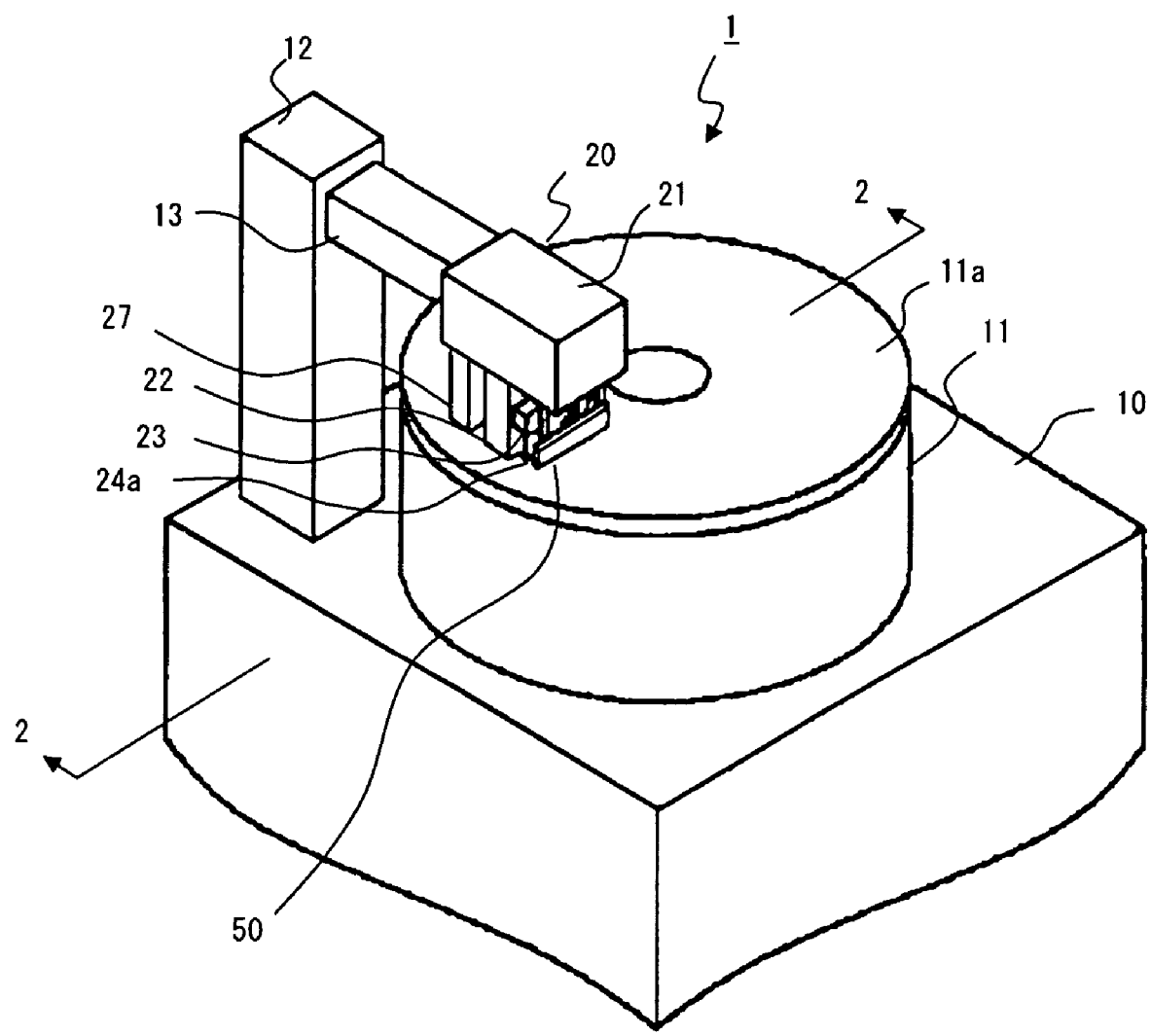
FIG. 1 schematically shows a perspective view of a lapping device of the invention.

Various embodiments of the invention will now be described in detail in conjunction with the drawings FIG. 1 schematically shows a perspective view of a lapping device according to an embodiment of the invention. The lapping device 1 is utilized for lapping a bar-shaped member for forming slider, i.e., a row bar, which is constructed by an array of sliders. The lapping device 1 comprises a working table 10, a revolving lapping table 11 supported on the working table 10, a support post 12 disposed at one side of the revolving lapping table 12, an arm portion 13 extending from the support post 12 and over the revolving lapping table 11, and a support member 20 carried by the arm portion 13. The revolving lapping table 12 has a lapping surface 11a thereon for lapping the row bar.

The support member 20 includes a support portion body 27 connected to the arm portion 13, a carrying base 22 located at the front end of the support portion body 27, a fixture holding portion 23 disposed at the front side of the carrying base 22 and a plurality of load adjusting portions 24a–24g (only 24a is shown in the figure) formed independently from each other. All the components of the support member 20 are covered by a cover 21. The carrying base 22 is connected via the arm portion 13 to an actuator (not shown) disposed on the support portion body 27, and the carrying base 22 can move up and down when being driven by the actuator. A lapping fixture 50 used for lapping a row bar is held by the fixture holing portion 23.

Figure 2:
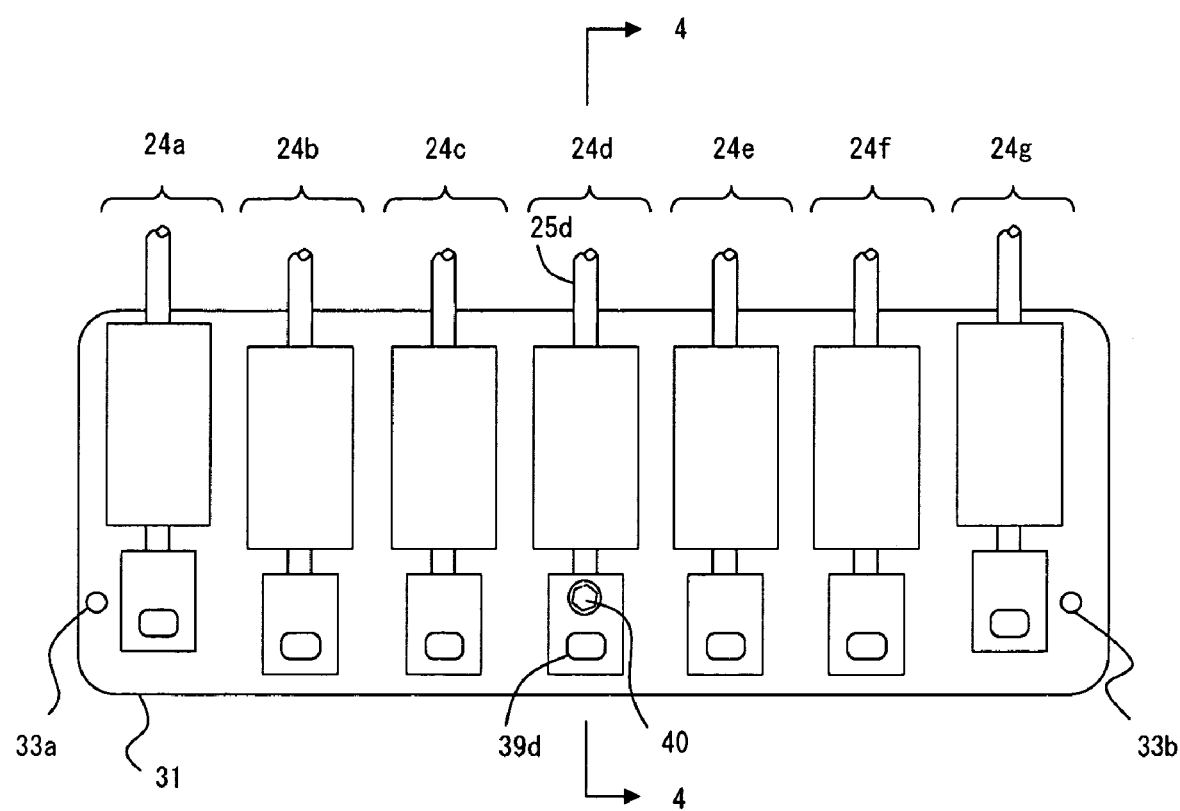
FIG. 2 is a side view of a fixture holding portion and a load adjusting portion of the lapping device shown in FIG. 1.
Figure 3:
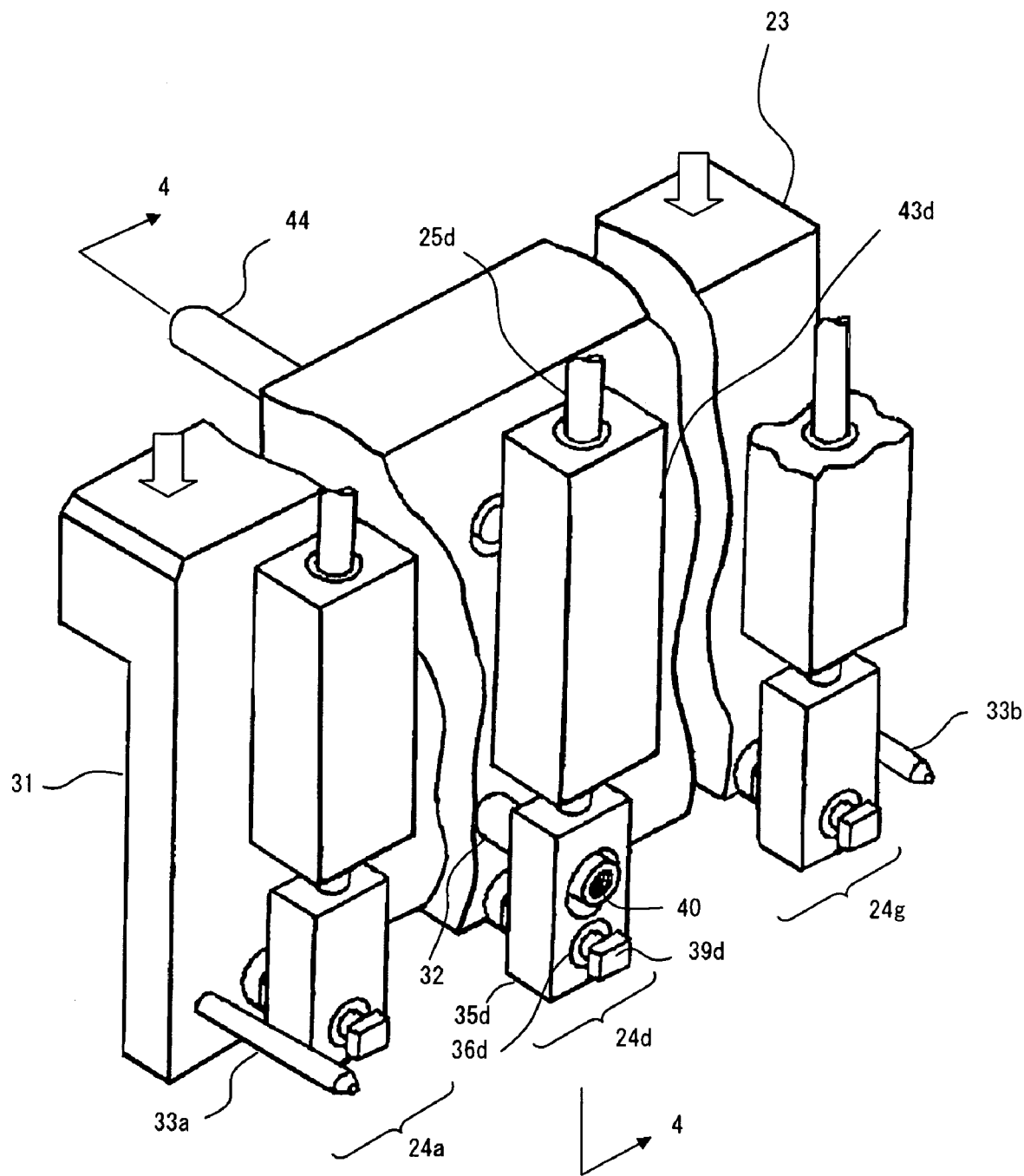
FIG. 3 is a perspective view of the load adjusting portion shown in FIG. 2.
Figure 4:
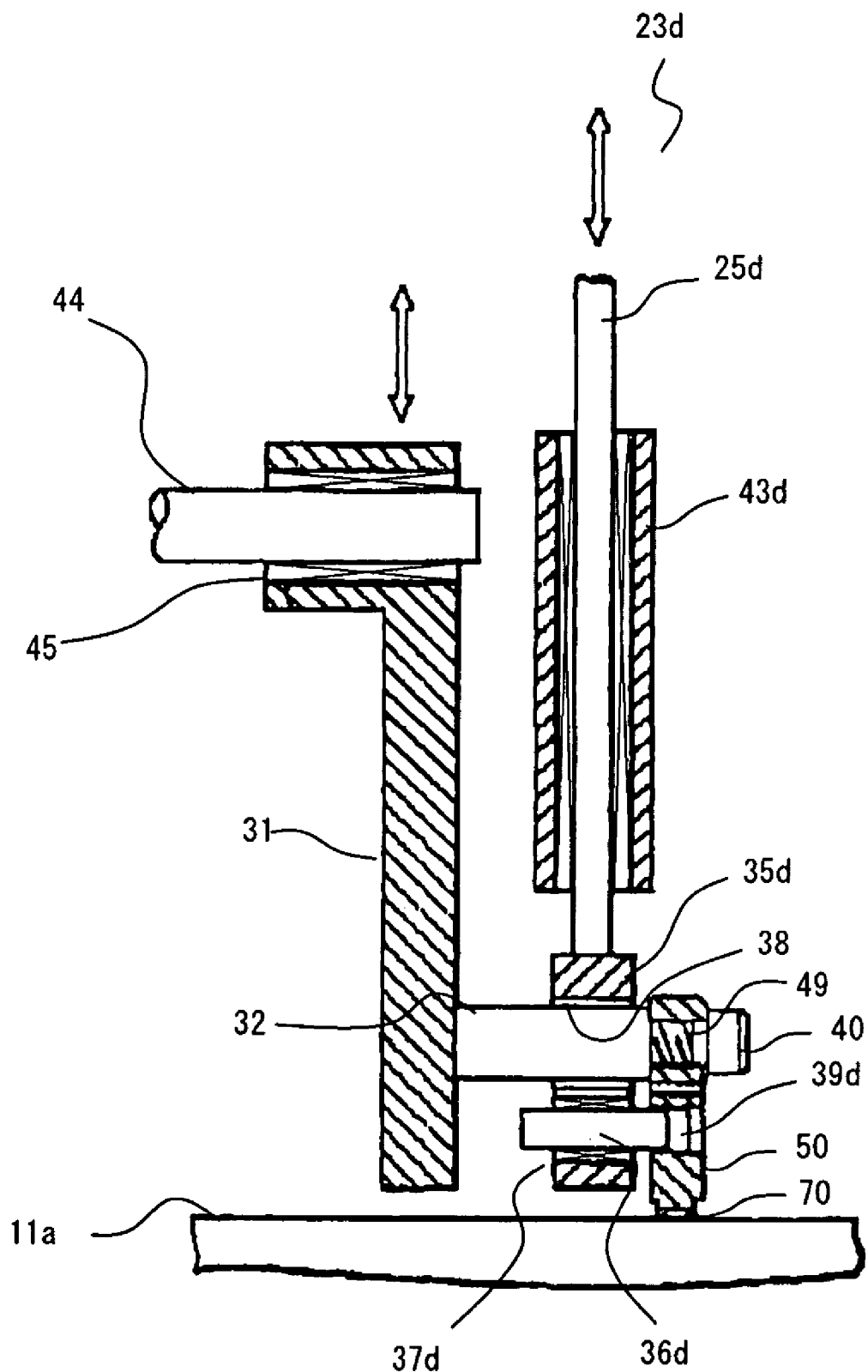
FIG. 4 is a side cross-sectional view of the fixture holding portion and the load adjusting portion with a lapping fixture mounted thereon.

FIG. 2 is a side view of the fixture holding portion and load adjusting portions taken along line 2—2 of FIG. 1. FIG. 3 is a perspective view of the load adjusting portions 24a, 24d and 24g shown in FIG. 2. FIG. 4 is a side cross-sectional view of the lapping fixture taken along lines 4—4 of FIGS.

Figure 5:
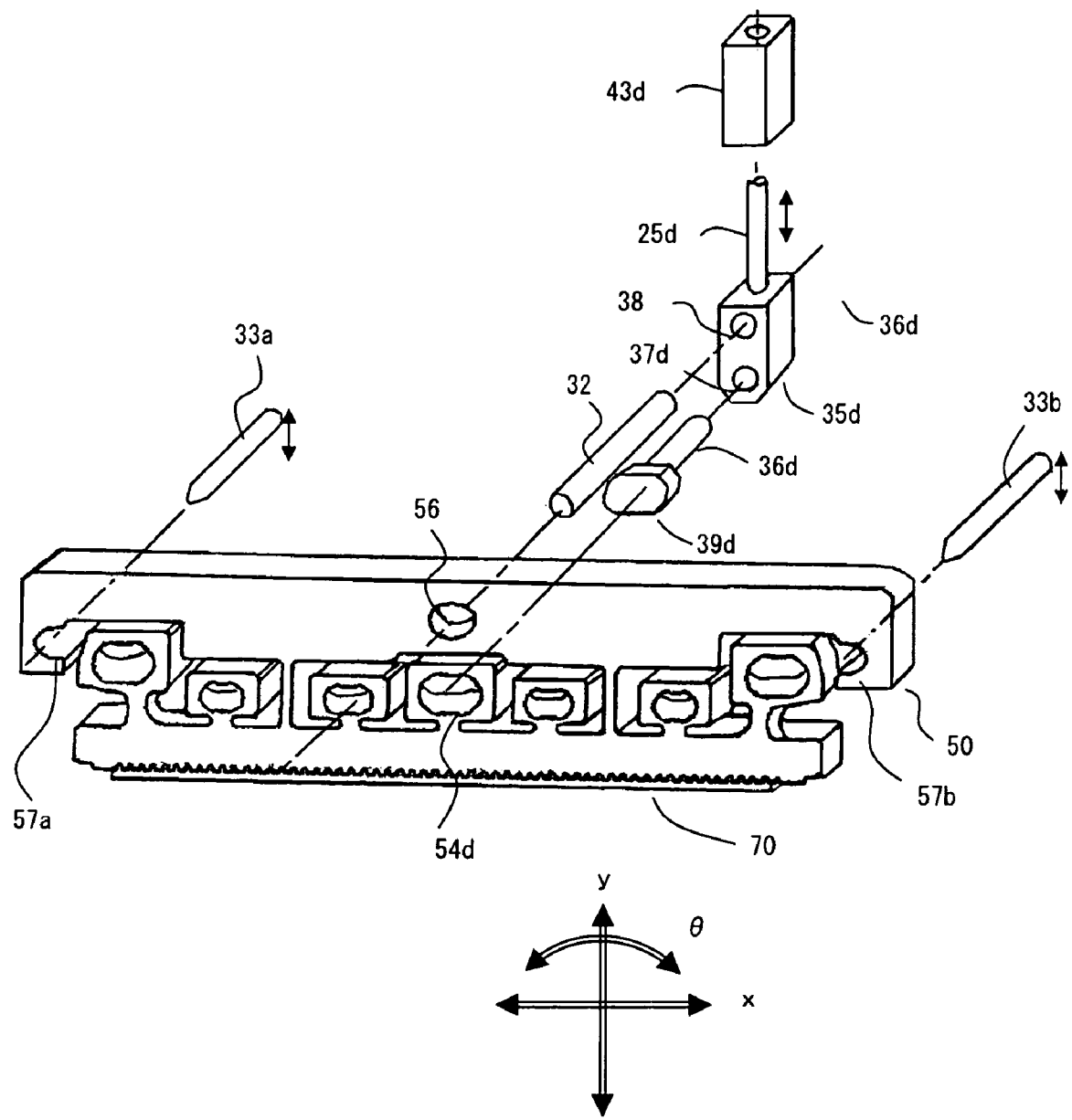
FIG. 5 is an exploded, perspective view of the load adjusting portion.

2, 3, wherein the fixture holding portion and the load adjusting portion are both fastened. FIG. 5 is an exploded, perspective view of a load adjusting portion (only one is shown).

As illustrated in FIGS. 3–4, the fixture holding portion 23 includes a holding portion body 31, a fixture securing pin 32 and a pair of guiding pins 33a, 33b. The fixture securing pin 32 extends forwardly from the middle position of the lower front end of the holding portion body 31. The guiding pins 33a, 33b extend forwardly from side positions of the lower front end of the holding portion body 31 respectively. The holding portion body 31 is connected to a rotary spindle 44 through a bearing 45 located thereon. In addition, the fixture holding portion 23 is connected to two actuators which are disposed on a top surface of the fixture holding portion 23 and which independently apply pressing force downwardly to the holding portion body 31 at both sides thereof (see the hollow arrow shown in FIG. 3 and hollow arrow arranged in left side of FIG. 4. In addition, the actuators are not shown in the figures). Accordingly, the holding portion body 31 is pressed downwardly, and rotates about the rotary spindle 44 by adjusting the forces applied by the actuators. Furthermore, with the motion of the holding portion body 31, the guiding pins 33a and 33b are also pressed downwardly and rotate, thus resulting in downward displacement different from each other. Moreover, the inclination of the MR element height may be corrected by rotating the holding portion body 31. Therefore, the incline angle may be very small and even limited to ±5 degree if a stopper (not shown) is used.

The fixture securing pin 32 has an inner screw thread formed at front end thereof, and the lapping fixture 50 is held among a screw bolt 40, a washer 49 and the fixture securing pin 32 and fixed thereby. Each of guiding pins 33a, 33b has a circle-shaped cross-section, and in the front portion of the fixture securing pin 32, the portion thereof is more adjacent to the distal end thereof, the diameter thereof is smaller.

Now describing the load adjusting portions 24a–24g. As illustrated in FIG. 2, the load adjusting portion comprises seven load adjusting portions 24a–24g which are arranged at front end of the holding portion body 31 in parallel. All the load adjusting portions 24a–24g have the same structure and can adjust the load applied to the row bar independently from each other. In addition, the level of the load adjusting portions 24a, 24g are higher slightly than that of the rest load adjusting portions. A through hole is defined in the load adjusting portion 24d for receiving the fixture securing pin 32.

Now taking the load adjusting portion 24d as an example. The load adjusting portion 24d has a load transfer rod 25d which can move up and down when driven by an actuator (not shown) disposed on the carrying base 22. As shown in FIGS. 4–5, the load transfer rod 25d is supported by a support member 43d and can move up and down and rotate. A cuboid-shaped load applying block 35d is mounted on the bottom end of the load transfer rod 25d. A bearing member 37d is disposed on the bottom end of the load applying block 35d, and a load applying pin 36d can extend through the bearing member 37d and rotate freely in the bearing member 37d.

The load adjusting portion 24d is also supported by the bearing member 37d of the load applying block 35d, and a load applying pin 36d which projects from the front end of the load applying block 35d is disposed on the front end of the load adjusting portion 24d. A cuboid-shaped head portion is formed at the front end of the load applying pin 36d.

In addition, as a characterized structure of the load applying block 35d, a hole 38 is defined in a position corresponding to the fixture securing pin 32 for receiving the fixture securing pin 32. The inner diameter of the hole 38 is larger slightly than the outer diameter of the fixture securing pin 32 such that the load applying block 35d can move freely in vertical and horizontal directions a predefined distance.

Then, referring to FIGS. 6A–6D, structure of a lapping fixture according to one embodiment is illustrated. FIG. 6a shows a top plan view of the lapping fixture of the embodiment; FIG. 6b shows a side view of the lapping fixture; FIG. 6c shows a side view of the lapping fixture; and FIG. 6d shows a bottom plan view thereof. In following description, the longitudinal direction of the lapping fixture is defined as x direction; the direction perpendicular to x direction is defined as y direction; and the rotation direction around an axis which is perpendicular to both of x direction and y direction is defined as θ direction.

As illustrated in FIGS. 6A–6D, the lapping fixture 50 of the embodiment includes a main body 51 mounted on the lapping device 1; a holding portion 52 which holds a product to be processed, that is, a row bar 70 along it's longitudinal direction and which is parallel with the row bar 70; two connection members 53a and 53b for connecting the holding portion 52 and the main body 51 together; seven load-applied portions 54a–54g connected to the holding portion 52 and which applies load to the holding portion 52 thus resulting in deformation thereof; and a plurality of wrist portions 55a–55g which connect the holding portion 52 and load-applied portions 54a–54g respectively. The two connection members 53a and 53b are disposed symmetrically at both sides along longitudinal direction of the lapping fixture 50. In addition, there exist three wrist portions in middle regions between the connection portions 53a and 53b, and two wrist portions in outer regions beyond the two connection portions 53a and 53b along their longitudinal direction. At least one wrist portion may be formed at middle regions between the two connection portions and outer regions beyond the two connection portions, and quantity of the wrist portions may be altered based on condition such as length of the product to be lapped and lapping precision. Although the lapping fixture 50 of the embodiment is made of SiC, other material such as ceramic, stainless steel, $ZrO_2$, or $Al_2O_3$ may also be used in manufacturing process.

An attaching hole 56 is formed at middle region of the main body 51 along its longitudinal direction such that a screw bolt 40 can pass through it. The main body 51 is fixed to the fixture securing pin 32 of the lapping device 1 by the screw bolt 40 and is kept stationary with respect to the fixture securing pin 32. The main body 51 is suspended in one point form at its attaching hole 56 by the lapping device 1. Furthermore, corresponding with the guiding pins 33a and 33b, matching portions 57a and 57b are formed on the main body 51 and engage with the guiding pins 33a and 33b, so as to align the fixture securing pin 32 with the attaching hole 56. The reason of suspending the lapping device 50 in one point form at the attaching hole 56 lies in: if the lapping fixture is secured at several positions, the lapping device will deform when several flexures or crinkles exist in the mounting contact surface or particle exists between the mounting contact surface and the lapping device. If the lapping fixture is mounted onto the lapping device in a deformation state, the original air bear surface (ABS) and the lapping surface will not be parallel with each other, instead, there will exist an angle or flexure, and the lapping process is performed under influence of the angle or flexure, accordingly, the flatness of the row bar will degrade. On the contrary, if the lapping fixture 50 is supported in one point form, the mounting contact surface of the lapping fixture 50 will be limited to a small area located at front end of the fixture securing pin 32. Consequently, the deformation of the lapping fixture 50 can be confined greatly even if the screw bolt 40 is in its most tight position. Therefore, the ABS flatness of the row bar 70 after it is dismantled from the lapping device 1 is maintained almost the same as that before the row bar 70 is dismantled from the lapping device 1. Accordingly, the lapping precision is maintained constant as well.

Each matching portions 57a and 57b disposed at both sides of the main body 51 have an opening facing the inner area of the main body 51 along its longitudinal direction. In lapping process, the main body 51 may rotate about the attaching hole 56, since the main body 51 is supported by one point. Thus the matching portions 57a and 57b are arranged to prevent this rotation from occurring. The cross-section of the matching portions 57a and 57b takes form of rectangle with rounded corners. In longitudinal direction of the lapping fixture 50, the matching portions 57a and 57b each have two parallel planes with a distance formed therebetween larger slightly than the diameter of the guiding pins 33a and 33b.

In addition, the matching portions 57a and 57b each have a curve surface which is opposite to the opening thereof and which forms part of the matching portion. The distance between the two curve surfaces is larger slightly than that formed between the outer sides of the guiding pins 33a and 33b. Therefore, the guiding pins 33a and 33b inserted in the matching portions 57a and 57b respectively each have a certain clearance in both vertical and horizontal direction. The deformation of the lapping fixture 50 is avoided by the clearance such formed when the lapping fixture 50 is mounted to the lapping device 1. In other word, in case where no clearance is present, when misalignment happens between the guiding pins 33a, 33b and the matching portions 57a and 57b, the lapping fixture 50 will be mounted to the lapping device 1 in a deformation state. Consequently, if the row bar 70 is lapped in the deformation state, the flatness of the ABS will be worsened. On the contrary, by arrangement of the clearance in each of the matching portions 57a and 57b, the lapping fixture 50 is allowed to have limited rotation around the attaching hole 56 and horizontal movement in the attaching hole 56, yet no strong deformation is generated when mounting the lapping fixture 50 to the lapping device 1.

Furthermore, the vertical movement of the guiding pins 33a and 33b can be transferred to the lapping fixture 50 by the matching portions 57a and 57b independently, such that the lapping fixture 50 may be pressed downwards and forcefully. In addition, the cross section of the matching portions 57a and 57b is not limited to rectangle with rounded corners, any other shape enable the rotation about the attaching hole 56 and horizontal movement in the attaching hole 56, such as semicircle may be taken. In addition, each matching portions 57a and 57b may putting it's opening facing outside, and in this case, the distance formed between the two curve surfaces of the matching portions 57a and 57b is smaller than that formed between the outer sides of the guiding pins 33a and 33b.

The holding portion 52 takes the form of a thin and long beam and can be bent when pressed by an external force. The holding portion 52 has a width and extends along longitudinal direction of the lapping fixture 50 such that the holding portion 52 has a length corresponding to that of the lapping fixture 50. A row bar securing portion 58 with a plurality of grooves formed therein is disposed on the bottom side of the holding portion 52 for attaching a plurality of blades to the grooves, the blades being used for cutting the row bar.

Each of the connection members 53a and 53b has an end coupled to the main body 51, while the other end thereof is coupled to the holding portion 52, thus forming a flat flexure structure. Accordingly, deformation of the connection members 53a and 53b is easy to happen with the bending of the holding portion 52. It is difficult to prevent deformation of the holding portion 52 from happening when flexible load is applied thereto. Namely, due to thin and long structure of the connection members 53a and 53b, the holding portion 52 may have free rotation along θ direction and movement along horizontal direction to a limited extent at regions adjacent the connection members 53a and 53b, such that accidental bending of the holding portion 52 at regions adjacent the connection members 53a and 53b is avoided.

Each load-applied portions 54a–54g have a rectangle hole with rounded corners formed therein for receiving by a certain clearance the head portions 39a–39g of the load applying pins 36a–36g therein respectively. The load-applied portions 54a–54g are capable of transferring loads in y direction originated from the head portions 39a–39g. Each head portions 39a–39g may have any other suitable sectional shape such as rectangle, ellipse, circle or crisscross, as long as it can transfer the load in y direction. The load-applied portions 54a and 54g are disposed at both sides along longitudinal direction of the row bar securing portion 58 respectively and higher than the rest five load-applied portions 54b–4f, which on the contrary are disposed evenly at middle region formed between the load-applied portions 54a and 54g. It is noted that all the load-applied portions may have a same height.

The central lines of the load-applied portions 54a and 54g locate outside with respect to the central lines of the two wrist portions 55a and 55b respectively, while the central lines of the load-applied portions 54b–54f are consistent with those of the wrist portions 55b–55f in x direction, respectively. The outward locations of the central lines of the load-applied portions 54a and 54g can compensate for flexure generated at both sides of the holding portion 52. Specifically, the loads in y direction applied to the load-applied portions 54a and 54b are transformed to load moments in θ direction, the load moments being able to strengthen the flexure generated at sides of the holding portion 52. However, in the embodiment, there are seven load-applied portions which can sufficiently and accurately control the deformation of the holding portion 52, as a result, this extending structure of the load-applied portions 54a and 54g may be omitted herefrom.

Then, a method of mounting the lapping fixture 50 to the lapping device 1 is illustrated. In the following description, take the load adjusting portion 24d as an example. Firstly, as illustrated in FIG. 5, the row bar 70 is mounted to the row bar securing portion 58 by method such as bonding, making the ABS of the row bar 70 as a bottom surface with respect to the row bar securing portion 58. The lapping fixture 50 is disposed at front end of the load applying blocks 35a–35g. The guiding pins 33a and 33b are engaged with the matching portions 57a and 57b of the lapping fixture 50 respectively, and the head portion 39d of the load applying pin 36d is received by the hole of the load-applied portion 54d (same to the other head portions). Additionally, the fixture securing pin 32 passes through the hole 38 which is larger enough than the outer diameter of the pin 32, then through the attaching hole 56, so as to adjust it's position relative to the lapping fixture 50. In this case, the screw bolt 40 (see FIG.

4) is inserted from the front end of the lapping fixture 50 to the attaching hole 56 with a washer 49 disposed between the screw bolt 40 and the attaching hole 56, such that the screw bolt 40 is screwed with the inner screw of the fixture securing pin 32. Consequently, the lapping fixture 50 is isolated by the washer 49 and sandwiched between contact surface of the screw bolt 40 and front end surface of the fixture securing pin 32. Thus, the lapping fixture 50 is secured by the fixture securing pin 32 which is connected to the holding portion body 31.

Next, a method of lapping the row bar 70 using the lapping device 1 and lapping fixture 50 is described. Here, also take the load adjusting portion 24d as an example. First, the lapping fixture 50, which is used for securing the row bar 70, is mounted onto the lapping device 1 by method illustrated above, then the carrying base 22 is moved downwards, making the surface to be processed of the row bar 70 contact with the lapping surface 11a of the revolving lapping table 11 as shown in FIG. 1. Therefore, the connection members 53a and 53b are pressed and bear an upward force applied by the holding portion 52, and a downward force applied by the main body 51.

In other words, the holding portion 52 maintains a tight contact with the lapping surface 11a at position of the connection members 53a and 53b, that is a first position, and the row bar 70 has its surface to be lapped touched with the lapping surface 11a (step 1).

Under this condition, the revolving lapping table 11 starts to rotate and grind the surface to be lapped of the row bar 70 (step 2).

As shown in FIG. 5, if the holding portion body 31 is driven downwards (y direction), the guiding pins 33a and 33b in conjunction with the matching 57a, 57b and connection members 53a, 53b will push the holding portion 52 downward, thus the lapping fixture 50 may be provided with a load in y direction (step 3-1). Moreover, slant manufacturing of the row bar 70 may be adjusted by adjusting the force applied to the sides of the holding portion body 31.

In addition, if move the load transfer rod 25d up and down (y direction), then the load applying block 35d will move up and down, also the load applying pin 36d inserted through the load transfer rod 25 and the head portion 39d will move up and down (y direction). Accordingly, the MR element height (lapping clearance, i.e., load clearance) adjacent the load transfer rod 25d is adjusted by the load transfer rod 25d (step 3-2). In this case, the load of the guiding pins 33a, 33b in y direction and the load of the load transfer rod 25d in y direction are controlled independently from each other.

These operations mean in other word, providing the surface to be lapped with load in y direction at a plurality of second positions on the holding portion 52 and lapping the surface to be lapped of the row bar 70, the second positions being different from the first position and disposed longitudinally with intervals formed therebetween.

By applying load to the load-applied portion 54d of the lapping fixture 50, the holding portion 52, row bar securing portion 58 and row bar 70 will deform properly. Furthermore, as the load adjusting portions 24a–24g can control the load independently, it is possible to control the MR element heights and throat heights of the sliders disposed in the row bar 70 to be their design values, and at the same time grind the ABS of the row bar 70 evenly.

Therefore, for the lapping device of the embodiment, as the load adjusting portions have freedom of load control in y direction, even if distributions of the MR element height and throat height of each slider of the row bar 70 are formed approximately as complex curve of high order, the deformation of the holding portion 52 may still follow the curve exactly. Accordingly, the MR element height and throat height of each slider may be accurately confined to a predetermined range in whole length of the row bar 70.

Furthermore, compared with conventional technology, the method of controlling the MR element height and throat height is changed slightly. The method is performed by monitoring the electrical lapping guide (ELG) and resistance of the MR element such as that disclosed in JP patent gazette NO. 2000-11315 and patent reference 3. For example, the electrical lapping guide may be formed in a predetermined position on the wafer and disposed at both sides along longitudinal direction of the row bar 70. The lapping device 1 switches between the electrical lapping guide arrayed on the row bar 70 and resistance of the MR element by a multiplexer, and monitors them in sequence, then controls the transfer devices which drive the load adjusting portions 24a–24g. Firstly the lapping device 1 monitors the resistance of the electrical lapping guide and performs a rough machining based on the resistance attained by monitoring, then controls the MR element height and throat height of each slider such that all the heights fall within a predefined tolerance range by monitoring resistances of each MR element.

Figure 7:
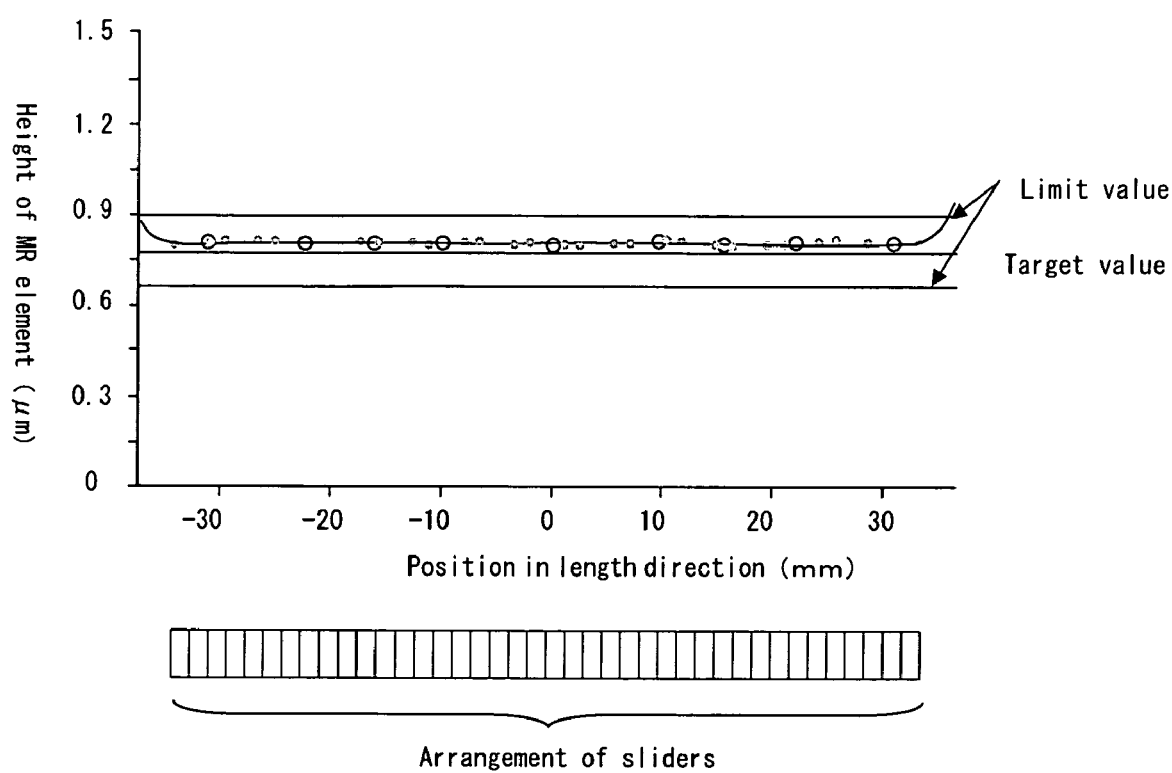
FIG. 7 is an illustrative view showing advantages produced by the lapping fixture of the invention.
Figure 8:
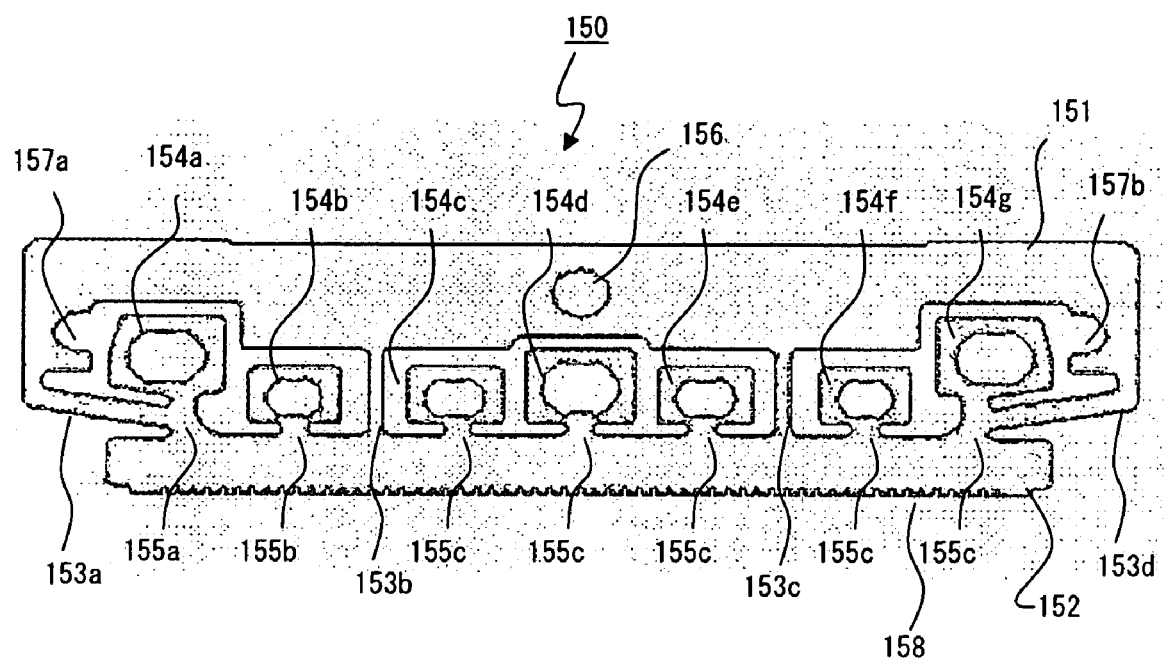
FIG. 8 is a top plan view of a conventional lapping fixture.
Figure 9:
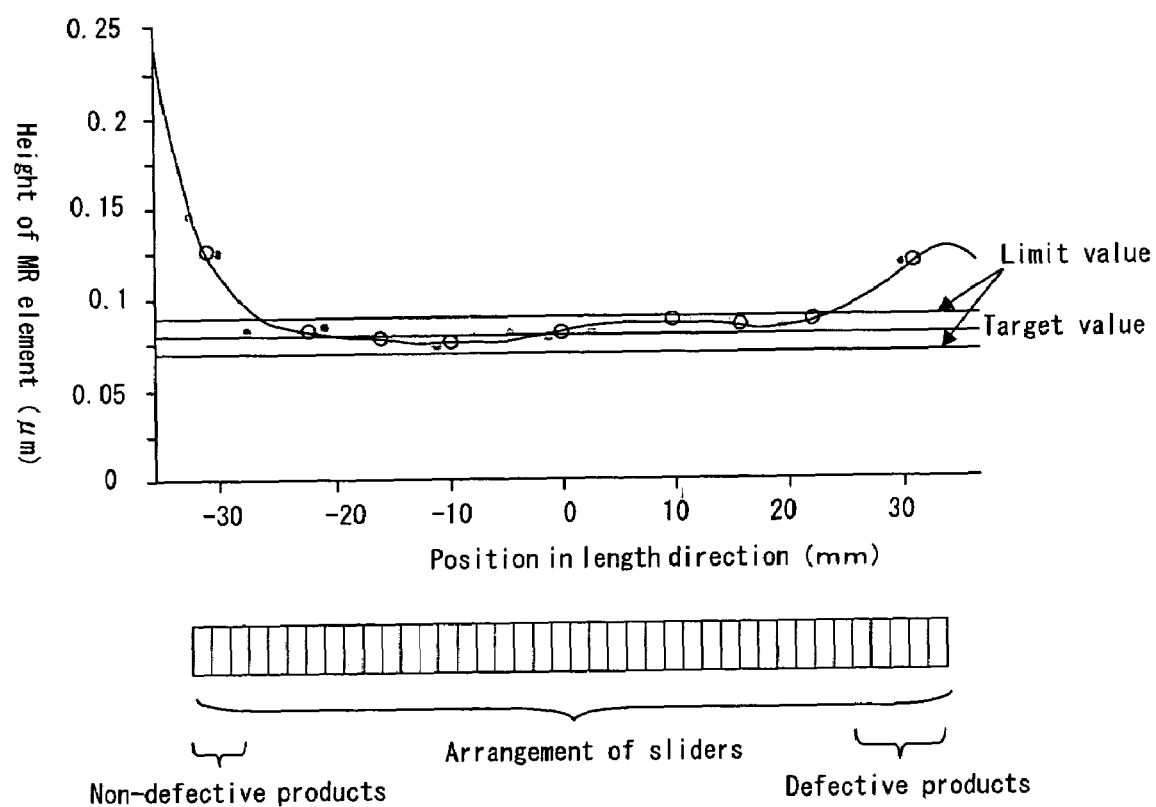
FIG. 9 is an illustrative view showing drawbacks of the conventional lapping fixture.

The following may give a description of the advantage of the invention. FIG. 7 is a diagram illustrating the flatness of a row bar using the lapping fixture of the invention. The reading method is the same as that of FIG. 9. Suppose that the target value of the lapping height with respect to the predefined datum is 0.08 μm with a tolerance of ±0.01 μm. In addition, table 1 shows clearance deviation in longitudinal direction of a conventional row bar. In the table, conventional technology uses a lapping fixture shown in FIG. 8. Suppose that the lapping time consumed in conventional technology is equal to that of the invention, and the deviation of the MR element height is a standard deviation with respect to the sample quantity of the row bars to be processed (106 or 130 row bars each of which consists of 40 sliders). MRR (MR resistance) deviation means the resistance deviation of the MR element (deviation relative to a resistance of 40Ω).

TABLE 1

| | Connection members (53a, 53d) | Lapping time (seconds) | Number of row bars being processed | Deviation of MR element height | Deviation of MRR |
|---|---|---|---|---|---|
| The Embodiment | No | 12.87 | 106 | 0.0041 | 1.36 |
| Prior Art | Yes | 12.13 | 130 | 0.0110 | 2.75 |

As illustrated in the figures and the able, compared to the prior art, the row bar of the embodiment is lapped with a higher flatness and smaller deviation in its longitudinal direction which comprises two end portions, since the press force is applied to all areas of the row bar having two end portions, thus the bending of the row bar is avoided. The lapping fixture of the embodiment equals the conventional lapping fixture shown in FIG. 8, supposed that the connection members 155a and 155d are removed from the conventional fixture. In the prior art, if the load-applied portions 154a and 154g are pressed by a load, the end portions of the holding portion 52 will deform, and this deformation will result in displacement with respect to the main body 51 to which no deformation is produced. Consequently, stress which counterbalances the load applied by the load-applied portions 154a and 154b is produced on the connection members 155a and 155d of the end portions, as a result, sufficient force can not be transferred to the row bar 70 via the load-applied portions 154a and 154b. In other hand, in the embodiment, the row bar can be provided with sufficient force via the load-applied portions 154a and 154b, since the counter force applied by the connection members 155a and 155d is non-operative. In addition, since there are no connection members 155a and 155b, the force applied by the load-applied portions 154a and 154b can be exerted on the end portions of the row bar directly, therefore the control precision is also improved.

Furthermore, it is noted that the connection members may at least have the following functions: when the combination of the lapping fixture 50 and row bar 70 is mounted to the lapping device 1, it is easy to make the row bar 70 kept tight contact with the lapping surface 11a without additional operation. Setting enough and necessary load-applied mechanisms which are independent from the connection members, limiting the connection between the main body 51 and holding portion 52, and the structure of prohibiting the counter-force coming from the connection members being transferred, benefit lapping control of the row bar. Based on this understanding, the connection members of the lapping fixture of the embodiment are disposed at least at two positions, and a plurality of load-applied portions are disposed at inner side and two outer sides of the connection portions.

Moreover, the row bar of the embodiment can be lapped more flatly, as a result, compared with prior art, the flatness deviation of the embodiment is improved. Thus, it will be a great advantage of the invention in future when the manufacturing precision of MR element height is demanded to be highly improved.

Furthermore, the invention is not limited to above-mentioned embodiment, for example, the load-applied portions may only have a freedom in y direction, or freedom in both y direction and x direction, or a freedom of y direction and θ direction. In addition, each load-applied portion may have different freedom.

In addition, the object to be lapped of the invention may include not only compound thin film sliders with induction-type magnetic transducer element for writing and MR element for reading incorporated therein, but also includes thin film sliders with induction-type magnetic transducer element incorporated therein for both writing and reading. In addition, the invention may be also used in polishing or grinding process besides lapping process.

Understandably, the invention is not limited to slider processing, but can be used for processing other objects.

What is claimed is:

1. A lapping fixture, which is mounted to a lapping device for holding and lapping an object to be lapped and has a longitudinal direction, comprising:
    a holding portion for holding the object with its surface to be lapped toward the lapping surface of the lapping device;
    a main body for mounting the lapping fixture to the lapping device;
    a plurality of load-applied portions which are arranged along said longitudinal direction and independent from said main body, said load-applied portions receiving a load which presses the surface to be lapped to the lapping surface tightly from at least the lapping device;
    a plurality of connection members connecting said holding portion and said main body along said longitudinal direction at intervals, said plurality of connection members including a pair of outer-most connection members; and
    a plurality of wrist portions connecting said load-applied portions and said holding portion; wherein
    at least one wrist portion is disposed between said adjacent connection members;
    at least one wrist portion is disposed at each outer side of the pair of outer-most connection members which are located at both ends of the longitudinal direction.

2. The lapping fixture as claimed in claim 1, wherein said two wrist portions disposed at both outmost ends of said longitudinal direction are located at a position which is adjacent to a position for fixing two end portions of said object to be lapped in the longitudinal direction.

3. The lapping fixture as claimed in claim 1, wherein the load-applied portions receive at least one of load for sliding said surface to be lapped on the lapping surface along said longitudinal direction, and load for rotating said surface to be lapped around an axis which is perpendicular to both said pressing direction and longitudinal direction.

4. The lapping fixture as claimed in claims 1, wherein said two connection members are disposed symmetrically along the longitudinal direction.

5. The lapping fixture as claimed in claims 1, wherein the main body is made of a kind of material containing SiC.

6. A lapping device, comprising:
    a lapping fixture of claim 1;
    a load applied mechanism to transfer load in pressing direction to said load applied portions; and
    a lapping surface.

7. A method for lapping an object having a longitudinal direction, comprising the steps of:
    providing a lapping fixture as defined in claim 1;
    pressing a holding portion of said lapping fixture, by which the object to be lapped with a longitudinal direction is held, toward the lapping surface at first positions separated at intervals along a longitudinal direction of the holding portion, and making the surface to be lapped of the object contact with the lapping surface;
    moving said surface to be lapped relative to the lapping surface; and
    providing the holding portion with a load in second regions which comprise regions between said adjacent first positions and regions beyond said first positions, and lapping said surface to be lapped of said object, said load being perpendicular to the lapping surface and pressing the surface to be lapped toward the lapping surface.

8. The method for lapping as claimed in claim 7, wherein said two second positions disposed at outmost sides of the longitudinal direction are located at a position adjacent to both end portions of said object to be lapped.

9. The method for lapping as claimed in claim 7, further comprising: providing the holding portion at said second positions with at least one of load for sliding said surface to be lapped on the lapping surface along said longitudinal direction, and load for rotating said surface to be lapped around an axis which is perpendicular to both said pressing direction and longitudinal direction.

* * * * *